US008093537B2

(12) United States Patent  
Linn et al.

(10) Patent No.: US 8,093,537 B2
(45) Date of Patent: Jan. 10, 2012

(54) PROCESS AND APPARATUS FOR THE PRODUCTION OF SHORT COOKING TIME RICE

(75) Inventors: Horst Linn, Eschenfelden (DE); Andras Vass, Veszprem (HU); Ivanne Pallai, Budapest (HU); Gyula Fazekas, Devavanya (HU); Janos Kovacs, Torokszentmiklos (HU); Istvan Edes, Torokszentmiklos (HU)

(73) Assignees: Linn High Therm GmbH, Eschenfelden (DE); Alfoldi Malomipari RT., Torokszentmiklos (HU)

( * ) Notice: Subject to any disclaimer, the term of this patent is extended or adjusted under 35 U.S.C. 154(b) by 125 days.

(21) Appl. No.: 12/429,473

(22) Filed: Apr. 24, 2009

(65) Prior Publication Data

US 2009/0206072 A1   Aug. 20, 2009

Related U.S. Application Data

(62) Division of application No. 10/506,597, filed as application No. PCT/EP03/02307 on Mar. 6, 2003, now abandoned.

(30) Foreign Application Priority Data

Mar. 6, 2002   (HU) .................................... 0200844

(51) Int. Cl.
*H05B 6/78* (2006.01)
*A23L 3/00* (2006.01)

(52) U.S. Cl. ......... 219/700; 219/682; 219/684; 426/241

(58) Field of Classification Search .............. 219/730, 219/388, 682, 700, 752, 762; 34/33, 181, 34/182, 316, 391; 426/234, 407, 243, 510, 426/511, 438, 455, 462, 461, 508; 99/483, 99/516, 536, 517, 534, 473, 355
See application file for complete search history.

(56) References Cited

U.S. PATENT DOCUMENTS 3,211,880 A * 10/1965 Johnson ........................ 219/745
3,578,463 A * 5/1971 Smith et al. ................... 426/241
4,233,327 A   11/1980 Ando et al.
(Continued)

FOREIGN PATENT DOCUMENTS

DE   3506099 A1   8/1986
(Continued)

OTHER PUBLICATIONS

Robert L. Roberts; Effect of Microwave Treatment of Pre-Soaked Paddy, Brown and White Rice; Journal of Food Science 1977; USDA Western Regional Research Lab, California, vol. 42, No. 3, 1977, pp. 804-806.
(Continued)

*Primary Examiner* — Quang Van
(74) *Attorney, Agent, or Firm* — Bachman & LaPointe, P.C.

(57) ABSTRACT

A process for the production of short cooking time rice is characterized by that hulled rice of at least 10% moisture content, if required in packaging suitable for ready cooking, is heat treated for 1 to 30 minutes continuously or interrupted by equal or alternating capacity microwave radiation, to reach maximum 130° C. An apparatus for the production of short cooking time rice has a microwave furnace with a tunnel made from a suitable material, wherein the rice packed into packages is movable within the tunnel by a conveyor. Regarding the easy and short process, a remarkable energy saving is possible.

14 Claims, 3 Drawing Sheets

U.S. PATENT DOCUMENTS

| | | | |
|---|---|---|---|
| 4,441,003 A * | 4/1984 | Eves et al. | 219/700 |
| 4,548,830 A | 10/1985 | Koyama | |
| 4,649,055 A | 3/1987 | Kohlwey | |
| 4,677,907 A * | 7/1987 | Weibye | 99/483 |
| 4,810,511 A | 3/1989 | Velupillai et al. | |
| 4,921,718 A | 5/1990 | Ohtsu | |
| 4,927,660 A | 5/1990 | Sano | |
| 4,986,995 A | 1/1991 | Kobayashi et al. | |
| 4,988,288 A * | 1/1991 | Melgaard | 432/72 |
| 5,089,281 A | 2/1992 | Baz et al. | |
| 5,107,395 A | 4/1992 | Kawakami et al. | |
| 5,130,153 A | 7/1992 | McIlroy et al. | |
| 5,160,819 A | 11/1992 | Ball et al. | |
| 5,271,163 A * | 12/1993 | Pikus et al. | 34/499 |
| 5,316,783 A | 5/1994 | Kratochvil et al. | |
| 5,550,242 A | 8/1996 | Gaa et al. | |
| 5,591,475 A | 1/1997 | Ishida | |
| 5,914,142 A | 6/1999 | Zartner | |
| 6,082,251 A | 7/2000 | Kendall et al. | |
| 2005/0103615 A1 * | 5/2005 | Ritchey | 203/10 |

FOREIGN PATENT DOCUMENTS

| | | |
|---|---|---|
| DE | 3830965 A1 | 6/1989 |
| DE | 19738882 C1 | 12/1998 |
| HU | 200667 B | 8/1990 |
| HU | 9903220 A2 | 2/2000 |
| JP | 59059160 A | 4/1984 |
| JP | 63269956 A | 11/1988 |
| JP | 01118688 A | 5/1989 |
| JP | 11032707 A | 2/1999 |
| JP | 11056267 A | 3/1999 |
| JP | 2006201500 A | 8/2006 |
| WO | 0174177 A1 | 10/2001 |
| WO | 0221050 A1 | 3/2002 |

OTHER PUBLICATIONS

Brown Rice; Alfarid Corporation; 2008.

* cited by examiner

PROCESS AND APPARATUS FOR THE PRODUCTION OF SHORT COOKING TIME RICE

CROSS REFERENCE TO RELATED APPLICATIONS

This application is a U.S. Divisional application of U.S. Ser. No. 10/506,597 filed Jun. 17, 2005.

BACKGROUND OF THE INVENTION (1) Field of the Invention

The subject of the invention is the plant size production of a better quality, marketable short cooking time rice by decreasing time, work and energy demand significantly by using microwave technology. The process decreases the loss of nutritional value, it consists only of a few, well adjustable steps and is environment friendly.

(2) Prior Art

Rice is one of the most important foods in the world and one of the basic elements of human nourishment which contains valuable carbon hydrates, proteins, mineral salts and vitamins. Rice is the main food of approximately 60% of the Earth's population.

Approximately 90% of rice is grown in Asia and is consumed there as well. Rice as half water, annual grass can be raised under very different climatic conditions.

Generally consumable white rice can be cooked with the usual kitchen techniques in about 20 minutes, but cooking time must be strictly kept, otherwise rice becomes overcooked or in the opposite, it remains raw. Rice absorbs heat and water during cooking. During the long cooking time besides the decrease of enjoyment value quality deterioration, occurs as well, because some of the valuable soluble components dissolve in boiling water and from the nourishment view they are lost. These standpoints played an important role—besides the speeding up of life—in the appearance of fast and half cooked rice products in the market and in the development of manufacturing procedures necessary for the production of above. As a result of this the popularity of more expensive, so-called "pretreated or precooked" short cooking time fast rice products increases more and more. Furthermore precooking makes it possible that some of the nutriments wander to the inside part of rice before burying.

The commercially available "pretreated or precooked" rice products can be divided into three groups:
  parboiling rice
  instant, ready to eat rice
  quick cooking rice These rice products have different nutrition values, characteristics, and are cooked with different kitchen technologies and the traditional consumer circle is also different. Historically the first pretreated rice product was parboiling rice, more manufacturing procedures were developed for its production. All other precooking methods originate from the classic parboiling process.

Parboiling Rice

The routes of precooking go back to ancient India, where the gathered, raw, rough rice was soaked during one night in water and on the following day was dried on the sun. After drying the hull of rice cracked, so it was very easy to husk it and use it as food. This ancient method was brought to perfection during the industrial manufacturing of parboiling rice, realizing those advantages which the pretreatment process offers.

These are the following:
  the valuable nutriments wander to the endosperm part of rice and thus they are kept
  because of the starting gelatinization the grain becomes hard and during hulling the 15 number of broken grain decreases, thus the value of use increases
  lipase becomes inactivated in the hull of rice and it increases non-perishability significantly
  cooking characteristics of rice become better, it doesn't become sticky The basic aim of precooking is to bring rice into a consumable, hulled form. With precooking it is easier to remove the hull. So at the parboiling method the main target is to remove grain hull easily and the precooking of rice is only a by effect.

Numerous patented ways of parboiling pretreatment were invented during the years, which aimed the easier, simpler, more energy saving and more effective solution of production methods.

U.S. Pat. No. 5,017,395 is about the production of a high stability precooked rice. In the soaking step the moisture content of rice is increased to 43-49 m %, and after that it is cooked for 1-10 minutes. Dehydrating is done in two steps, delicately, the first step is drying when the moisture content of rice is decreased to 25-35 m % and after that rice is tempered on 38-66° C. at least for 2 hours for approximately 6 hours and finally dried.

During tempering the starch content of rice becomes fully gelatinized. The so processed rice—because of the slow drying and dehydrating procedure—becomes free from tension, the possibility of breaking, damaging of rice grains is eliminated.

U.S. Pat. No. 5,316,783 aims the production of better quality precooked rice, by keeping the preferable characteristics of already known processes and of the so manufactured products. According to this method the colouration that occurs generally during the heat treatment of rice (Maillard browning effect) is prevented, furthermore the taste of rice will also be better. During preparation rice is soaked on 70° C. for 90 minutes, and the unnecessary water is removed. After that rice is treated with 190° C. hot air for 20 minutes or under pressure with steam for 20 seconds. On basis of comparative experiments it can be determined that the rice processed with this patent method became fully gelatinized and its substance is better, it doesn't contain stuck or damaged, broken grains. Its taste and colour is also more favourable than of the earlier known products.

U.S. Pat. No. 5,130,153 is about the production of precooked rice in more steps. Rice is treated, soaked in water on 50-95° C. until its moisture content reaches 17-28 m %, and then it is steamed on 100-125° C., its moisture content is further increased, then kept under pressure for 1-5 minutes, and after decompression the moisture content of rice is decreased to 24 m % during approximately 1 hour. After that rice is dried until it reaches the microbiologically stable state, approximately 8-10 m % moisture content. For heating and cooking microwave technology can also be used. According to the process the cooking of pre-soaked rice is carried out under 2-4 bar pressure on 135° C. Heating is done preferably with microwave radiation. After cooking the pressure is decreased to an atmospheric level and rice is dried. Moisture content is adjusted to 13 m % by post-drying. This method requires relatively few heat and energy. The so processed product doesn't change colour and fulfils consumer demands better. The patent also covers the machine which is used for precooking.

Hungarian patent no. 200.667 is about the production of precooked rice. The rough rice is soaked, then treated hydrothermally, then dried and polished. The essence of the invention is that rough rice is treated with microwaves on 100° C. for 1-15 minutes, after that unnecessary water is removed and the required 15-20 m % moisture content is adjusted with further microwave treatment.

U.S. Pat. No. 4,810,511 outlines a more-step process on precooking of rice. In the first step rice is soaked in 40-70° C. water for 3.5-5 hours until reaching 26-32 m % moisture content. After that rice is put through a microwave radiation, pretreatment on 95-100° C. when the moisture content is increased to 40 m % and the gelatinization of starch begins. After removing the unnecessary water rice is treated with a second microwave radiation on 90-110° C. for at least 120 minutes. In this phase the starch content becomes fully gelatinized and the moisture content decreased to 22 m %. Finally the moisture content of. rice is adjusted to 14 m % with hot air drying. The microwave treatment is carried out with electromagnetic radiation of 1-300 m wavelength, frequency 915-22125 mHz. The energy requirement of the process is very small because after the second microwave treatment the moisture content of the products can be decreased to 23-25 m %. The energy of drying can further be cut if the second microwave treatment is done in a hot air stream.

Parboiling treatment—besides its undisputable advantages—also has drawbacks: and it is the change of colour to yellow. Rice consuming eating culture is very different in the world, and in many places snow-white colour of rice is a requirement. The yellow perhaps brown colour of parboiling rice is caused by the products of Maillard reaction which take place during heat transmission steps. Parboiling rice is usually ready in 20 minutes—perhaps a little longer—it is not so sensitive to overcooking. This time is still quite long, so further research was done on reducing cooking time. This target was reached with additional heat treatment, as a result of which fast or quick cooking time rice products were won.

Quick Cooking Rice

Quick cooking rice offers a fast and comfortable kitchen technology solution as it can be cooked in 5-10 minutes and the short cooking time can be kept precisely, thus generally good quality, good looking rice garnishment can be made. At the same time the pretreated, microbiologically stable quick cooking rice can be stored practically for an unlimited time.

In case of quick cooking time it is an important requirement that at the end of cooking time we get same cooked, non-sticky, whole and regular formed rice. These conditions are not easy to fulfill at the same time, several methods were developed to reach the appropriate quality.

The classic quick cooking process follows the parboiling method step by step with the difference that the level of cooking, i.e. the value of gelatinized starch reaches 80-90%. Because of perishableness the water content of grains have to be readjusted to 12-14 m %. In case of quick cooking rice the main target is the proper precooking and re-drying to a microbiologically stable moisture content on 20° C. These two processes are very important because past-cooking time and porosity of rice grains depends on them, which determine the quality of directly consumable rice. After that the ready to eat rice can be cooked from the prepared rice in less than 10 minutes.

For making quick cooking rice, the following is a typical and optimal process according to U.S. Pat. No. 5,089,281:
  usual soaking step on 50-70° C.
    after a two step cooking process moisture is 60-65%, gelatinization is 80-90%.
      water precooking with 1:2 rice water ration 2.5 minutes, 100° C.
      steam cooking: following water cooking 5.5 minutes, 1.5 atm
    after two step drying process moisture is 8%, gelatinization is 100%
      conveyor, hot air drying 7 minutes 150° C.
      fluid bed drying 1 minutes 150° C.

The procedure is suitable to produce quick cooking, hulled, white rice, parboiling rice and brown rice. The so manufactured rice is consumable after 5-10 minutes kitchen cooking. Rice can also be cooked with microwave oven for 2-20 minutes.

U.S. Pat. No. 4,233,327 writes down quick cooking rice cooking process. At the generally used soaking step 0.1-1 m % tenside e.g. oil is added to the water. During cooking the whole starch content of rice is gelatinized, and then water content is reduced in two steps in a hot air stream. When reaching 25 m % moisture content rice is let to rest on 15-35° C. for at least 30 minutes. The delicate drying method and the use of low temperature prevents the breaking of grains. You only have to pour hot water on the so prepared rice and after a few minutes it can be served.

U.S. Pat. No. 4,548,830 is about the production of rice mush. The washed rice is cooked in more steps in salted water, steamed under pressure and dried with air on microwave treatment until 12-13 m % moisture content is reached.

U.S. Pat. No. 4,794,012 writes down the production of dried, partly gelatinized rice. Rice is first soaked in water under 30° C. for 1-16 hours, then further soaking is done in water with higher temperature, 50-70° C. for another 30-90 minutes. The cooking of rice is carried out with 95-100° C. steam for 5-30 minutes. Drying is done with hot air stream on 60-140° C. for 20-100 minutes or under pressure with 200-400° C. air for 7-30 seconds. The so processed product can be prepared to eat in a short time, its substance is rolling, and the grains don't stick to each other.

The novelty of U.S. Pat. No. 4,986,995 is that at the cooking step of rice the amount of oxygen present reduced by adding inert gas to 4-12 mol oxygen/100 g rice. This the colouration can be prevented. According to the patent in case of higher oxygen values brown coloration appears on the product.

U.S. Pat. No. 6,082,251 introduces a procedure and a machine for cooking food, and amongst them rice. The patent mainly describes the equipment used for cooking which is divided into several zones or chambers. The procedure consists of more steps. After the usual soaking the moisture content of rice is adjusted to 50-65 m % in the cooking zone of the equipment. After that rice is washed with 25° C. water and pre-steamed; soaked in 80° C. water for 15 minutes and then steamed on atmospheric pressure for 15 minutes. The drying of rice is done in three separate zones of the machine on 250 and 195° C. The procedure is capable of making parboiling rice as well.

U.S. Pat. No. 4,649,055 introduces a procedure to make parboiling dried rice. The soaking of rice is done on 65° C. on 5 pH, in a mildly acidic agent for 15 minutes. After filtering cooking and steaming is done on atmospheric pressure on 100° C. for 10 minutes. After that with several stirring rice is let to rest on 5 pH for a short time and then dried. At the cooking step it is very important that the moisture content of rice is over 60 m %, because—according to the patent—the colouration of rice can be prevented by that.

One of the modified versions of above presented procedures is U.S. Pat. No. 4,927,660, which also describes the manufacturing process of quick cooking rice. As per the patent rice which contains a certain amount of barley, bean or vegetables is swollen in the presence of additives, e.g. ethyl-alcohol. The substance of the product is excellent, no sticking of the grains is experienced. The patent skips the step of soaking and instead of that rice is treated with watery alcohol and put forth to market in vacuum packing. Because of the alcohol content the product can be stored well in spite of its high water content (40 m %). According to U.S. Pat. No. 4,921,718 soaking is done in a watery alcoholic solution, because quality reducing polluting materials like bran leftovers, oils, sugar and protein remains can be removed with this. Brown rice is first cleaned, washed, then unnecessary water is removed and soaking for 10-60 minutes follows it. Soaking is carried out in ethyl-alcohol containing water. After cooking rice is packed in an inert gas agent.

Hungarian patent no. P9903220 is also about making quick cooking rice. The basis of the procedure is that rice which has more than 17-32 m % moisture content is mechanically manipulated, hulled wet and thus bran is removed. Wet hulling results good eating quality rice.

Hungarian patent P9500519 is about the production of half cooked rice, which is free from the Maillard effect brown. According to the patent the favourable colour is reached without using additives.

You can produce short cooking time rice partly different from the classic precooking method. The soaking step is intensified, by alternating heating and cooling, thus rice absorbs 15-20 m % more water than its own weight (U.S. Pat. Nos. 5,550,242 and 5,591,475). This state is preserved with freezing where the gelatinization has not started yet. The product is ready to eat in 3-5 minutes with heating without water.

Instant, Ready to Eat Rice

The development of ready to eat rice was supposed to eliminate the kitchen technique disadvantages of raw rice and parboiling rice. The essential point is the following: raw rice or parboiling rice is completely cooked maybe seasoned as well, and after freezing it is put to market. This product type is ready to eat after a simple preheating. However, besides the advantages, important disadvantages also have to be taken into consideration. One disadvantage is that during production, delivery, and storing freezing is needed all the time, which means a significant energy demand and makes the product more expensive. As our invention does, not refer to the making of ready to eat rice, we do not review the related literature.

From the above you can see that the speeding up of cooking rice, thus the production of precooked or quick rice have been occupying researchers for a long time and the literature of achieved results is very large.

Ready to eat and quick rice needs water, energy and several procedures, in spite of the fact that procedure parameters were already optimized.

Further disadvantages of the introduced technologies are the following:
Precooking is basically a hydrothermal treatment thus the dissolution of soluble components from the grains (e.g. starch, protein, etc.) is unavoidable.
Because of the high moisture content which is adjusted with soaking (35-60 m %) and because of the steaming heat treatment tension occurs in the inside of the grain which results in cracks and in the breaking of the product. It is also a consequence of multiple-stage manipulation (mechanic surface moisture removal, final drying).
Summarizing the procedures on making parboiling or quick cooking rice it can be stated generally, that the follow ing steps are part of each process with smaller or bigger differences:

The manufacturing procedures used for pretreatment consist of the main steps below:
Soaking: usually between 50-70° C., in 6-16 excess water for 2-6 hours, when the moisture content of rice increases to 30-40 m %.
Water removal, resting: the removing of unnecessary water is carried out mechanically for example by spinning. During rest time moisture content evenly spreads in the whole grain.
Heat treatment: usually cooking on 95-105° C. for 10-20 minutes, during which the gelatinization of partly crystal endosperm (starch) starts.
Drying: the heat treated and high moisture content rice grains are treated with hot air until moisture content reach the required 14 m %.

The above, generally use manufacturing procedures can be divided into three groups on basis of the heat treatment:
Steaming method: every step of the procedure is carried out on atmospheric pressure, heat transmission is done by steaming.
Dry-heat method: heat transmission is carried out by dry air, using non-watery liquid or hot sand. Microwave technique can be placed into this procedure group as a heat transmission procedure using pure energy.
Pressure steaming method: instead of soaking only humidifying is used and the steaming is done under pressure.

The common characteristic and at the same time disadvantage of the earlier presented parboiling or quick cooking rice making procedures is that the final product is only ready after numerous steps and a great amount of water is needed to reach the required gelatinization. This water has to be removed after the heat treatment and the moisture content needs to be reduced to 12-14 m %, in order to have a microbiologically stable, non perishable rice.

SUMMARY OF THE INVENTION

On basis of the above our aim was to develop such a simple, in plant size adaptable procedure on producing precooked, short cooking time or quick cooking rice which consists of only one step (heat treatment) and requires no or only small amount of water input. Heat treatment is carried out by microwave treatment of definite wavelength and time.

The main objects of the present invention are to provide a process for the production of short cooking time rice as claimed in claim 1 and apparatus for carrying out the same process as claimed in claim 15. Preferred improvements of the inventive process are claimed in claims 2 to 14 and preferred improvements of the inventive apparatus are claimed in claims 16 to 21.

During our experiments we were astonished to see that for hulled rice which corresponding to the microbiological stability contains 14 m % water, it is enough to put it through one heat treatment, or microwave treatment and with this once microwave treatment we get a directly marketable or at choice a further storable product. Thus by leaving the energy and time demanding drying step and by leaving the soaking step before heat treatment we get a directly consumable, proper quality and gelatinized product. The product of our invention has all the favorable characteristics as the earlier products that were processed with more steps. Our short cooking time or quick cooking rice corresponds both aesthetically and in flavour to market requirements. As a result of the delicate heat treatment rice grains are free from tension, are whole and not cracked. As in our invention's procedure the presence of water exceeding the microbiological stability amount is not necessary, therefor microwave treatment can be done directly in the packing used for cooking the rice, e.g. in polyethylene foil.

The microwave heating and treatment, respectively is preferably carried out in a Microwave Continuous Belt Heater manufactured by Linn High Therm GmbH, Germany, as stated in DE 19738882 C1.

Further surprising recognition of or invention is that during the expediently conducted microwave treatment rice got gelatinized in the proper value even if it does not contain more than 14 m % water. After heat treatment there is no need for additional drying, because rice doesn't contain water which exceeds the microbiologically stability value, and herewith the possibility of tension inside rice grains is further reduced. You can see it from the earlier introduced literature summary that drying is a vital step of processing, therefore it is done in more steps, sometimes interrupted with long resting periods, in order to avoid the occurrence of tension inside grains. This step can be skipped entirely on basis of our invention and the expediently packed product can be marketed directly.

We will demonstrate our invention—without limiting the circle of safeguard—on the following examples:

1. EXAMPLE

We clean 1000 g hulled, middle sized, equilibrium moisture content rice. We fill the cleaned rice in a polyethylene foil bag of such size that the layer thickness of rice in the filled, heatsealed, evened bag is 1.5-2 cm. The polyethylene bag filled with rice is put into a steady energy distribution microwave apparatus. The frequency rate of microwave used for the treatment is 2450 mHz. After adjusting 1500 W microwave capacity (W/g=1.5) we start microwave treatment. The time of continuous microwave treatment is 3 minutes.

At the end of treatment the temperature of rice because of the microwave energy absorption is 105-110° C. The microwave treated, packed rice is kept on room temperature for 6 hours, while we turn it once in every 30 minutes. The so treated rice takes up the temperature of its environment. Its moisture content is uniform, and is equal to its starting moisture content, its colour is white, grains do not stick together, its starch content is equal to that of basic, untreated rice.

Cooking time of the so precooked rice is 10-12 minutes.

2. EXAMPLE

The procedure conforms to the procedure in example 1., with the difference that the microwave treatment of foiled rice is not continuous, but it is interrupted, it means that each 1 minutes microwave treatment is followed by a 10 second interval, then 1 minute microwave treatment again, then another 10 second break, and finally another 1 minute microwave treatment, so it is 3 times 1 minute treatment with intervals. As a result of interrupted microwave treatment the temperature of rice is slowly increased, at the end of the first minute is 60-65° C., after the second minute it is 85-90° C., and it only reaches 100-105° C. at the end of the final 1 minute treatment. As a result of this the degree of precooking is better, and the cooking time of treated rice is reduced to 10-11 minutes.

3. EXAMPLE

This procedure conforms to the procedure in example 1., with the difference that the microwave treatment of foiled rice is not continuous, but it is interrupted, i.e. 1 minute microwave treatment is followed by a 10 second interval, then 1 minute microwave treatment again, then another 20 seconds break, then after 1 minute treatment 30 seconds break follows, and finally another 1 minute microwave treatment, so it is 4 times 1 minute treatment with intervals. As a result of interrupted microwave treatment the temperature of rice is slowly increased, at the end of the first minute is 60-65° C., after the second minute it is 70-75° C., after the third minute it is 85-90° C. and it only reaches 100-105 0 end of the final 2 minute treatment As a result of this the degree of precooking is better, and the cooking time of treated rice is reduced to 9-10 minutes.

4. EXAMPLE

We proceed with everything as per example 1., with the difference that the rice is not packed into vacuum foil and bag during preparation but into a perforated packing. During microwave treatment the moisture content of treated rice decreases by 0.5-1.5 m %, but after storing it in room temperature for 24-48 hours it takes up equilibrium moisture content.

The cooking time of so prepared rice is 10-12 minutes.

5. EXAMPLE

The precooking procedure is the same as in example 4. with the difference that microwave treatment is done in two phases. In the first phase microwave capacity is 750 W, the value of W/g is 0.75. Treating time in the: first phase is 2 minutes. At the second microwave treatment microwave capacity is 1500 W that is W/g is 1.5. Treatment time in the second phase is 3 minutes. At the end of the first microwave stage the temperature of the material is 65-70° C. and it only reaches 95-105° C. after the second stage. The moisture content of so processed rice decreases by 0.5-1.5 m %, but during storing in room temperature for 24-48 hours it takes up equilibrium moisture content.

Its ready to eat cooking time is 10-11 minutes by keeping good quality in the same time (white colour, undamaged surface, swollen grains).

6. EXAMPLE

The microwave precooking method is the same as in example 4, with the difference that microwave treatment is done in two phases, with interruptions. In the first phase microwave capacity is 750 W, so W/g value is 0.75.

Treatment time in the first phase is 4 times 1 minute, with interruptions. In the second microwave treatment the capacity is 1500 W that is W/g=1.5. Treatment time in the second stage is 2 minutes also in an interrupted method, so it is two times 1 minute. At the end of the first microwave treatment the temperature of the material is 65-70° C. and it reaches 95-105° C. temperature only after the second stage treatment.

The moisture content of so processed rice decreases by 0.5 m %, its ready to eat cooking time because of the longer precooking is reduced to 9-10 minutes, by keeping good quality.

7. EXAMPLE

We clean 5250 g hulled, middle size, equilibrium moisture content rice. The cleaned rice is filled in a polyethylene foil bag of such size that the layer thickness of rice in the filled, heat-sealed, evened bag is 7-7.5 cm. The polyethylene bag filled with rice is put into a steady energy distribution microwave apparatus. The frequency rate of microwave used for the treatment is 2450 mHz. After adjusting 1500 W microwave capacity (W/g=0.285) we start microwave treatment. The time of continuous microwave treatment is 12 minutes.

At the end of treatment the temperature of rice because of the microwave energy absorption is 105-110° C. The microwave treated, packed rice is kept on room temperature for 6 hours, when rice takes up the temperature of its environment. Its moisture content is uniform, and is equal to its starting moisture content, its colour is white, grains do not stick together, its starch content is equal to that of basic, untreated rice. Cooking time of the so precooked rice is 10-12 minutes.

8. EXAMPLE

The rice packed in Polyethylene bag was placed 8 pieces to a stack each by each and moved on a conveyor belt continuously through a tunnel in the micro wave furnace. This tunnel was completely build by plastic panel to generate and keep a special wet atmosphere of 90-95° C. in the surrounding of the rice bags. To keep a certain condition, a part of the wet atmosphere could be sucked of. The specific power consumption is W/g=0.25.

The rice temperature during process is preferable 105-108° C. to get a well precooked rice with a very good quality. The cooking time of this precooked rice is 10-12 minutes.

The advantages of our invention compared to the earlier known procedures are summarized as follows:
- We can produce quick cooking rice which corresponds to market requirements and expectations, and has good quality with only one heat treatment step.
- The usual soaking and drying steps after cooking used in the earlier procedures are skipped.
- We do not input water exceeding the microbiological stability amount during the procedure.
- Rice can be heat treated even in the packaging.
- The valuable, soluble nutriments do not dissolve.
- In case of air-proof packaging later microbiological or mechanical pollution of rice is avoidable.
- Our technology is an environment friendly, energy saving, simple and delicate heat treatment procedure.
- The product made by our method has all the beneficial advantages of the earlier, much complicated and with more steps processed products.

BRIEF DESCRIPTION OF THE DRAWINGS

Further features and advantages are described below in combination with the accompanying drawings which are showing in FIG. 1 a schematical view of a preferred embodiment of the apparatus according to the present invention, FIG. 2 a front view of a tunnel mounted in the microwave furnace of the apparatus according to FIG. 1, and FIG. 3 a sectional view along the lines III-III in FIG. 2, and FIG. 4 a sectional view along the lines IV-IV in FIG. 3.

DETAILED DESCRIPTION OF THE PREFERRED EMBODIMENT(S)

Figure 1:
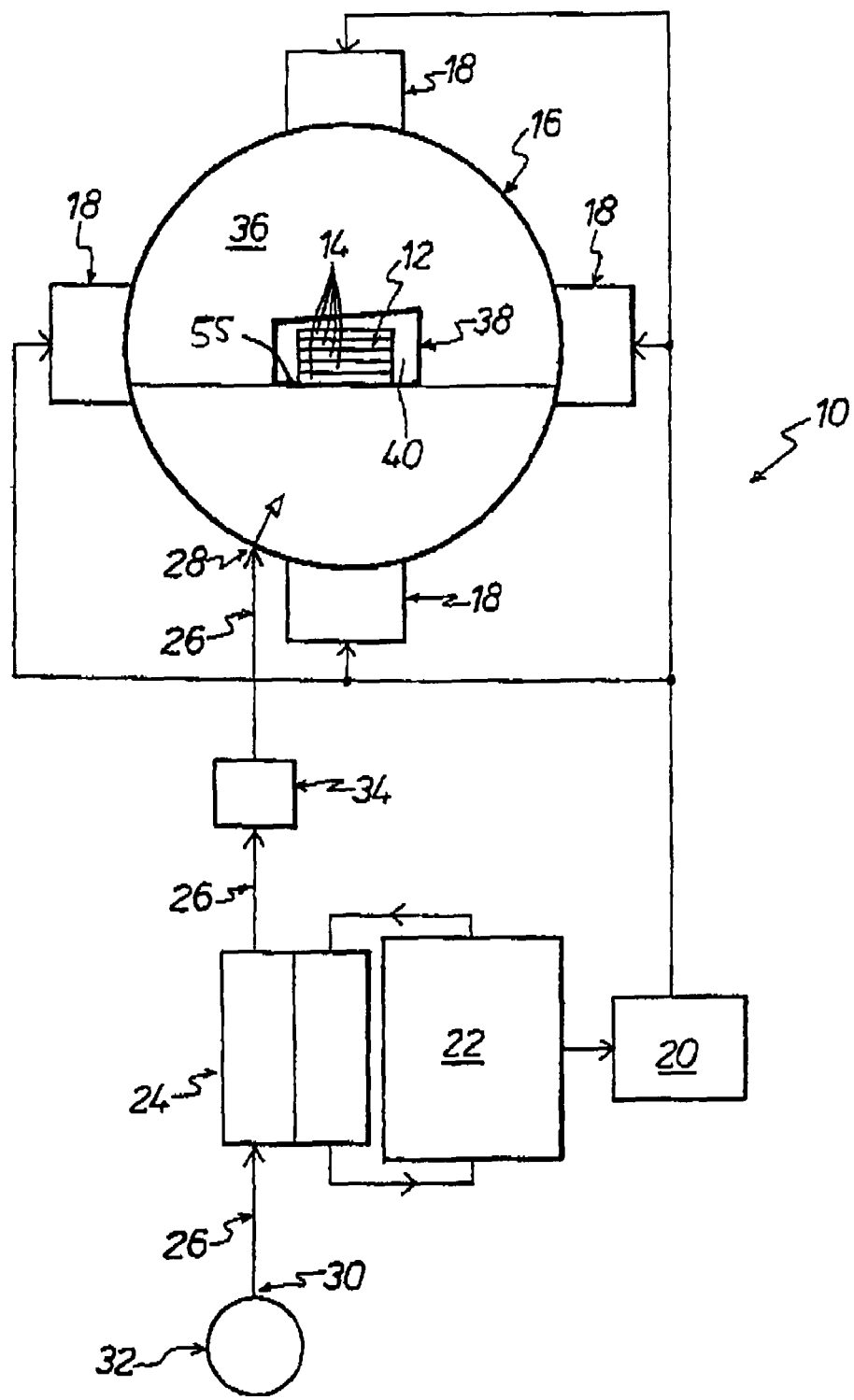

FIG. 1 shows in a schematical view an embodiment of the inventive apparatus 10 for the production of short cooking time rice 12 which is packed in bags 14. The bags 14 with the rice 12 are staged one above the other.

The apparatus 10 comprises a microwave furnace 16 which is provided with a number of microwave generators 18. The microwave generators 18 are connected with an electric generator 20 which may be driven by a combustion engine 22. The combustion engine 22 is provided with a heat exchange means 24. The heat exchange means 24 is connected with a conduit means 26. The conduits means 26 is connected at its one end 28 with the microwave furnace 16 and with its opposite second end 30 with a. fan 32. The fan 32 is provided for driving fresh air through the heat exchange means 24 into the microwave furnace 16. The conduit means 26 is provided with a filter element 34, which is arranged between the heat exchange means 24 and the microwave furnace 16 and which is used for filtering the air flowing through the conduit means 26 into the microwave furnace 16.

In the inner space 36 of the microwave furnace 16 there is mounted a tunnel 38. A conveyor means 55 extends through the tunnel 38 and is provided for carrying the bags 14 containing the rice. These conveyor means may be by example a roller means, a belt means, a walking beam means, a pusher means and so on.

In the tunnel 38 there is generated a special wet atmosphere in the surrounding 40 of the said rice bags 14.

Figure 2:
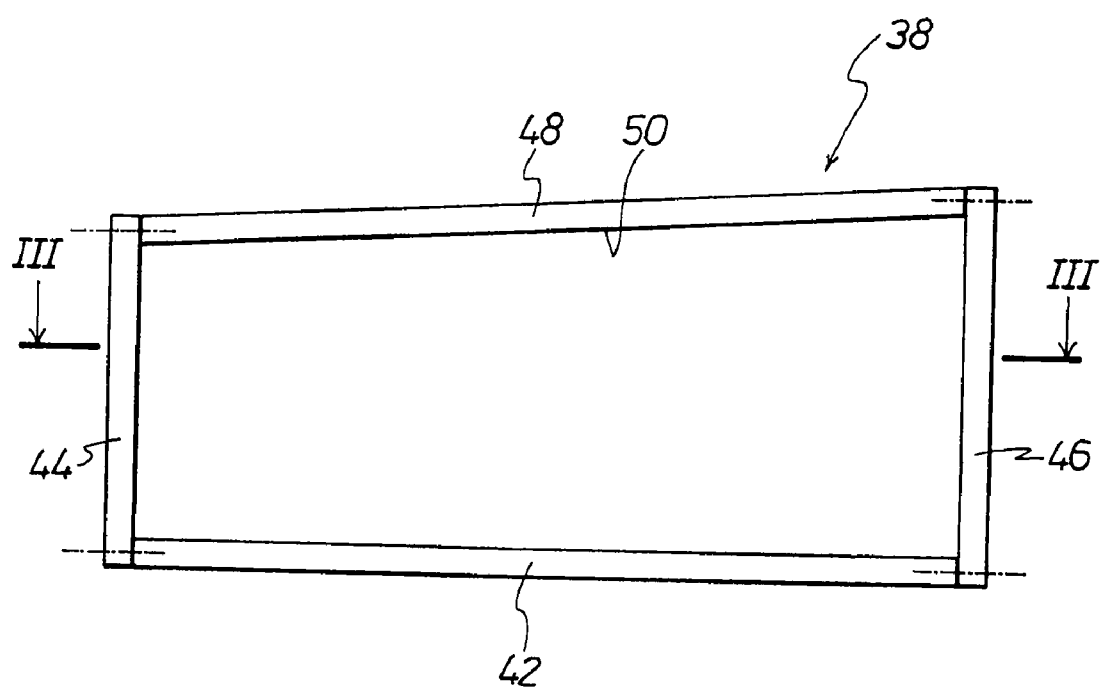
Figure 4:
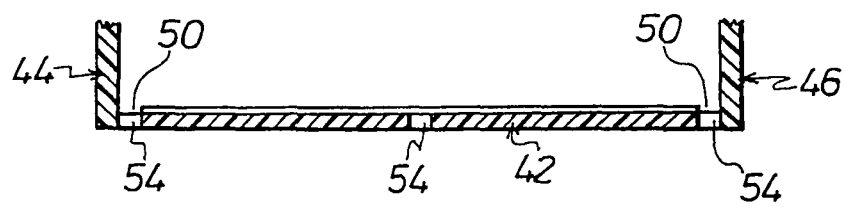
Figure 3:
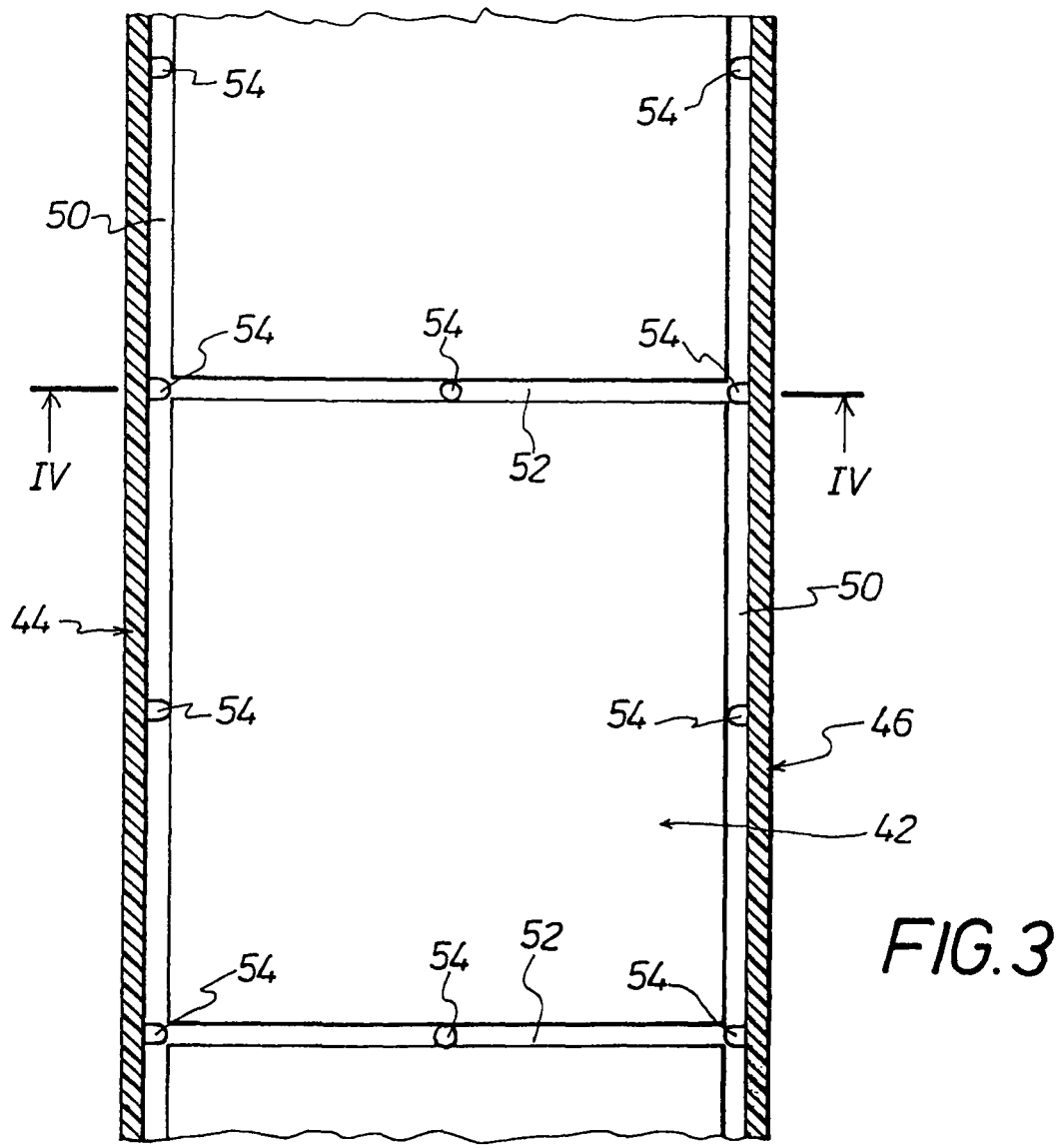

The tunnel 38 is also shown in FIGS. 2, 3 and 4, wherein FIG. 4 is a sectional view along the lines IV-IV in FIG. 3.

FIG. 2 shows in a front view the tunnel 38 which comprises a bottom area element 42, a pair of side area elements 44 and 46 and a top area element 48. The height of the side area element 44 differs from the height of the side area element 46, so that the top area element 48 is inclined from the side area element 46 to the side area element 44. From this inclination follows, that condense water and steam, respectively, is collected on the inner face 50 of the top area element 48 and will flow to the side area element 44 and from this side area element 44 to the bottom area element 42.

As shown in FIGS. 3 and 4 the bottom area element 42 is provided with longitudinal grooves 50 as well as with transversal grooves 52. The transversal grooves 52 are connecting the longitudinal grooves 50 which are provided adjacent the side area elements 44 and 46. The longitudinal grooves 50 and the transversal grooves 52 are formed with apertures 54 for distributing remaining condense water and steam, respectively, from the microwave furnace 16.

The grooves 50 and 52 may also be arranged in other shapes, e.g. angled or curved.

What is claimed is:

1. Apparatus for the production of short cooking time rice comprising a microwave furnace, a tunnel in the microwave furnace, conveyor means for moving hulled rice packed into bags within the tunnel, said tunnel being provided with a top area element for collecting condensed water and steam, respectively, and the tunnel being provided with a bottom area element formed with apertures or with a perforation or with channels for distribution of any remaining condensed water and steam, respectively, wherein said microwave furnace is connected with a conduit means which is provided with a heat exchange means of a combustion engine which is connected with a generator provided for the generation of energy for the microwave furnace, wherein said conduit means is connected at its one end with the microwave furnace and with its opposite second end with a fan.

2. Apparatus according to claim 1, wherein said tunnel is made from a material selected from the group consisting of ceramic material, plastic material, and quartz glass.

3. Apparatus according to claim 1, wherein said top area element is formed in roof-like way and is angled or curved respectively semi-circular.

4. Apparatus according to claim 1, wherein said top area element is provided with a means for collecting drops of condensed water or steam, respectively.

5. Apparatus according to claim 1, wherein said top area element is provided with a cooling means for generating condensation.

6. Apparatus according to claim 1, wherein a volume ratio of said tunnel and a volume of the rice packed in a number of bags is 3:1.

7. Apparatus according to claim 1, wherein at least one of said tunnel and the microwave furnace is insulated to prevent heat losses.

8. Apparatus according to claim 1, wherein said tunnel is equipped with an additional heating means.

9. Apparatus according to claim 8, wherein said additional heating means comprises at least one heating element and/or hot air.

10. Apparatus according to claim 1, wherein said tunnel is equipped with a channel system for heating medium for heating the tunnel.

11. Apparatus according to claim 10, wherein said heating medium is hot air.

12. Apparatus according to claim 1, wherein said conduit means is connected with a fan.

13. Apparatus according to claim 1, wherein said conduit means is provided with a filter element.

14. Apparatus according to claim 13, wherein a solar heat exchanger is used in lieu of said combustion engine.

\* \* \* \* \*